United States Patent [19]

Shekleton

[11] Patent Number: 5,167,122
[45] Date of Patent: Dec. 1, 1992

[54] FUEL SYSTEM FOR A TURBO MACHINE

[75] Inventor: Jack R. Shekleton, San Diego, Calif.

[73] Assignee: Sundstrand Corporation, Rockford, Ill.

[21] Appl. No.: 693,569

[22] Filed: Apr. 30, 1991

[51] Int. Cl.⁵ .......................... F23R 3/38; F02C 7/22
[52] U.S. Cl. ..................................... 60/743; 60/39.141
[58] Field of Search ................ 60/734, 39.141, 39.142, 60/746, 739, 740, 743

[56] References Cited

U.S. PATENT DOCUMENTS

| | | | |
|---|---|---|---|
| 2,706,520 | 4/1955 | Chandler et al. | 60/739 |
| 3,283,502 | 11/1966 | LeFebvre . | |
| 3,335,567 | 8/1967 | Hemsworth | 60/739 |
| 3,468,333 | 9/1969 | Skinner | 60/39.141 |
| 3,613,360 | 10/1971 | Howes . | |
| 4,062,183 | 12/1977 | Davies et al. | 60/739 |
| 4,070,826 | 1/1978 | Stenger et al. . | |
| 4,198,815 | 4/1980 | Bobo et al. . | |
| 4,337,616 | 7/1982 | Downing | 60/746 |
| 4,683,715 | 8/1987 | Iizuka et al. | 60/733 |
| 4,798,190 | 1/1989 | Vaznaian et al. | 60/743 |
| 4,815,665 | 3/1989 | Haruch | 239/432 |
| 4,817,389 | 4/1989 | Holladay et al. | 60/739 |
| 4,835,962 | 6/1989 | Rutter | 60/737 |
| 4,897,994 | 2/1990 | Shekleton | 60/39.141 |
| 5,003,771 | 4/1991 | Kester et al. | 60/39.141 |

FOREIGN PATENT DOCUMENTS 1186158  4/1985 Canada .
WO89/05903  6/1989 World Int. Prop. O. .

Primary Examiner—Richard A. Bertsch
Assistant Examiner—Timothy S. Thorpe
Attorney, Agent, or Firm—Wood, Phillips, Van Santen, Hoffman & Ertel

[57] ABSTRACT

Complexity in a fuel injection system for a gas turbine engine including an annular combustor (26) may be reduced by utilizing a plurality of circumferentially spaced fuel injectors (46) within the annular combustion (26). First and second conduit branches (108, 110; 120, 122) in fluid parallel with one another are provided with one of the branches (108; 120) being connected to at least one of the injectors (46-1; 46-1, 46-3, 46-5) and the other of the branches (110; 122) being connected to the remainder of the injectors (46-2 through 46-6, inclusive; 46-2, 46-4, 46-6). A pump (102) interconnects a source of fuel (100) and the branches (108, 110; 120, 122). A normally closed, pressure responsive valve (114) isolates the other branch (110, 122) from the source (100) at low pressures typical of the starting of the turbine engine and is openable at somewhat higher pressures to allow fuel to flow to all of the injectors (46).

8 Claims, 3 Drawing Sheets

FUEL SYSTEM FOR A TURBO MACHINE

FIELD OF THE INVENTION

This invention relates to gas turbine engines, and more particularly, to gas turbine engines provided with inexpensive, high efficiency fuel system.

BACKGROUND OF THE INVENTION

In relatively small turbine engines in airborne environments, fuel flows at high altitudes, particularly during the starting of the turbine engine, are frequently quite low. Consequently, so-called "start injectors" requiring high fuel pressures are commonly used to achieve pressure atomization of the fuel sufficient to initiate ignition and generate sufficient hot gas as to accelerate the turbine wheel of the engine toward a self-sustaining speed. Once that has occurred, the start injector or injectors are de-energized and drop out of the system, fuel necessary to maintain and further accelerate the turbine wheel being provided through so-called "main" injectors.

This mode of operation requires that the start injector or injectors be purged of residual fuel once they are deactivated. If that is not done, the heat within the engine combustor will shortly cause pyrolysis of residual fuel in the injector which will result in the formation of gummy, coke-like products which plug or partially plug the start injectors. Consequently, such a system requires control components, including valves for coupling or decoupling start injectors from the system as well as some sort of means that provide for purging of the start fuel injector or injectors. These components add expense to the construction of the fuel system as well as an element of increased complexity which, in turn, may lower reliability.

In the above-identified, co-pending application, as well as its parent application, there are disclosed unique fuel injectors for use in turbine engines that achieve good atomization of fuel at low flow rates by air blast atomization as opposed to pressure atomization. The present invention seeks to make use of such injectors in a new and improved fuel system that is simple in construction and which, therefore, may be economically fabricated and which has improved reliability.

SUMMARY OF THE INVENTION

It is the principal object of the invention to provide a new and improved fuel injection system for a gas turbine engine More specifically, it is an object of the invention to provide such a fuel injection system which has enhanced reliability and which may be inexpensively fabricated.

An exemplary embodiment of the invention achieves the foregoing objects in a fuel injection system for a gas turbine engine of the type including an annular combustor. The system includes a plurality of circumferentially spaced fuel injectors, each adapted to be disposed within the annular combustor. A source of fuel to be combusted is provided and connected to first and second conduit branches which are placed in fluid parallel with one another. One of the branches is connected to at least one of the injectors and the other of the branches is connected to the remainder of the injectors. Means, including a pump, interconnect the fuel source in the branches and a normally closed, pressure responsive valve is provided to isolate the other branch from the interconnecting means for low fuel pressures typical of the starting of a turbine engine and is openable at somewhat higher pressures to allow fuel to flow to all of the injectors. At least the injector in the one branch includes a fuel injecting aperture and a fuel impingement or fuel film atomizing flange aligned with the aperture.

In a preferred embodiment, a fuel shut-off valve is located between the fuel pump and the two branches and the system is characterized by the absence of any valves between the shut-off valve and the injectors other than the pressure responsive valve.

In a preferred embodiment of the invention, the pressure responsive valve is a check valve.

In one embodiment of the invention, all of the fuel injectors include the aforementioned apertures and flanges.

In a preferred embodiment of the invention, the one branch has only one of the injectors, whereas, in an alternative embodiment, the one branch has a plurality of the injectors.

A modified embodiment of the invention contemplates that there be substantially equal numbers of injectors in both of the branches.

In one embodiment of the invention, the injection apertures of the injectors in the other branch are somewhat larger than the aperture of the at least one fuel injector in the one branch.

In a highly preferred embodiment, the fuel injectors are adapted to inject fuel into an annular combustor in the generally circumferential direction.

Other objects and advantages will become apparent from the following specification taken in connection with the accompanying drawings.

DESCRIPTION OF THE PREFERRED EMBODIMENT

Figure 1:
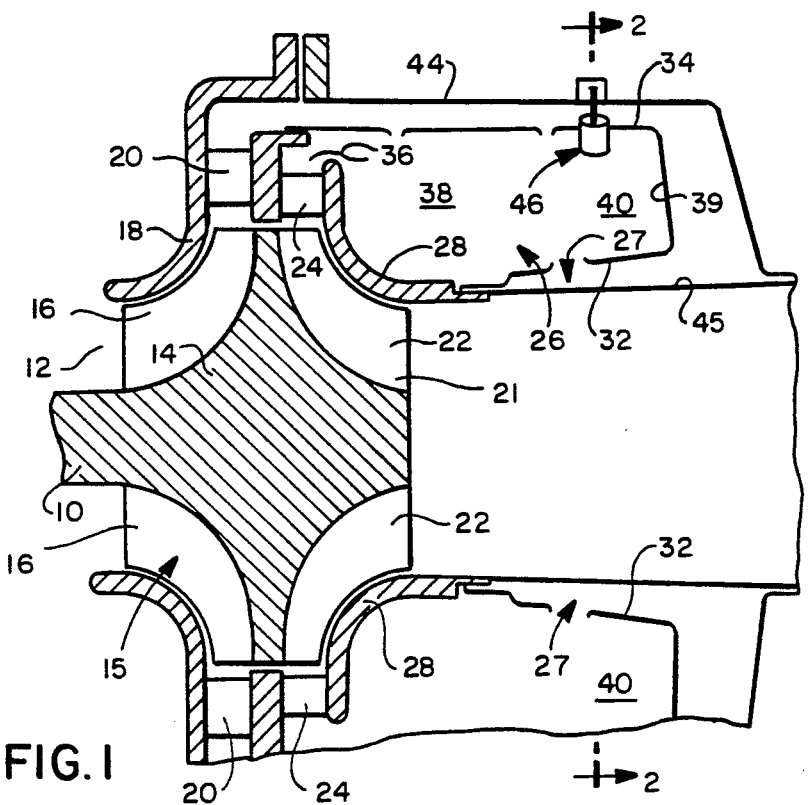
FIG. 1 is a somewhat schematic, sectional view of a gas turbine engine embodying the invention.

An exemplary embodiment of the gas turbine made according to the invention is illustrated in the drawings in the form of a radial flow, air breathing gas turbine. However, the invention is not limited to radial flow turbines and may have applicability to any form of air breathing turbine utilizing an annular combustor.

The turbine includes a rotary shaft 10 journaled by bearings not shown. Adjacent one end of the shaft 10 is an inlet area where air is to be compressed. The shaft 10 mounts a rotor, generally designated 14, which may be of conventional construction. Accordingly, the same includes a centrifugal compressor, generally designated 15, including a plurality of compressor blades 16 adjacent the inlet 12. A compressor shroud 18 is provided in adjacency thereto and just radially outwardly of the radially outer extremities of the compressor blades 16 is a conventional diffuser 20.

Oppositely of the compressor blades 16, the rotor includes a conventional turbine wheel, generally designated 21, including a plurality of turbine blades 22. Just radially outward of the turbine blades 22 is an annular nozzle 24 which is adapted to receive hot gasses of combustion along with dilution air as, for example, from an annular combustor, generally designated 26. The compressor 15, including the blade 16, the shroud 18, and the diffuser 20 deliver compressed air to the annular combustor 26, and via dilution air passages 27, to the nozzle 24 along with gases of combustion generated within the combustor 26. That is to say, hot gases of combustion from the combustor 26 are directed via the nozzle 24 against the blades 22 to cause rotation of the rotor 14 and thus the shaft 10. The latter may be, of course, coupled to some sort of apparatus requiring the performance of use for work. Alternatively, the output from the turbine may be in the form of thrust.

A rear turbine shroud 28 is interfitted with the combustor 26 to contain gases against the turbine blades 22. The combustor 26 has a generally cylindrical inner wall 32 and a generally cylindrical outer wall 34. The two are concentric with each other about the rotational axis of the shaft 10 and merge to a necked down area 36 which serves as an outlet from an interior annulus 38 defined by the space between the walls 32 and 34 of the combustor 26. The outlet 36 is, of course, in fluid communication with the nozzle 24.

A third wall 39, generally concentric with the walls 32 and 34 extends generally radially to interconnect the walls 32 and 34 and to further define the annulus 38.

Opposite of the outlet 36 and adjacent the wall 39, the interior annulus 38 of the combustor includes a primary combustion zone 40 in which the burning of fuel primarily occurs. The primary combustion zone 40 is an annulus or annular space defined by the generally radially inner wall 32, the radially outer wall 34 and the radially extending wall 39. Other combustion may, in some instances, occur downstream from the primary combustion zone 40 in the direction of the outlet 36 and in some instances, provision may be made for the dilution air to flow entirely about the combustor 26 rather than enter the interior of the same through the passages 27.

A further annular wall 44 is generally concentric with the walls 32 and 34 and is located radially outward of the latter. Similarly, an inner annular wall 45 inside the wall 32 is provided and together with the wall 44 provides a plenum surrounding the combustor 26 to confine the compressed air from the compressor 12.

Figure 2:
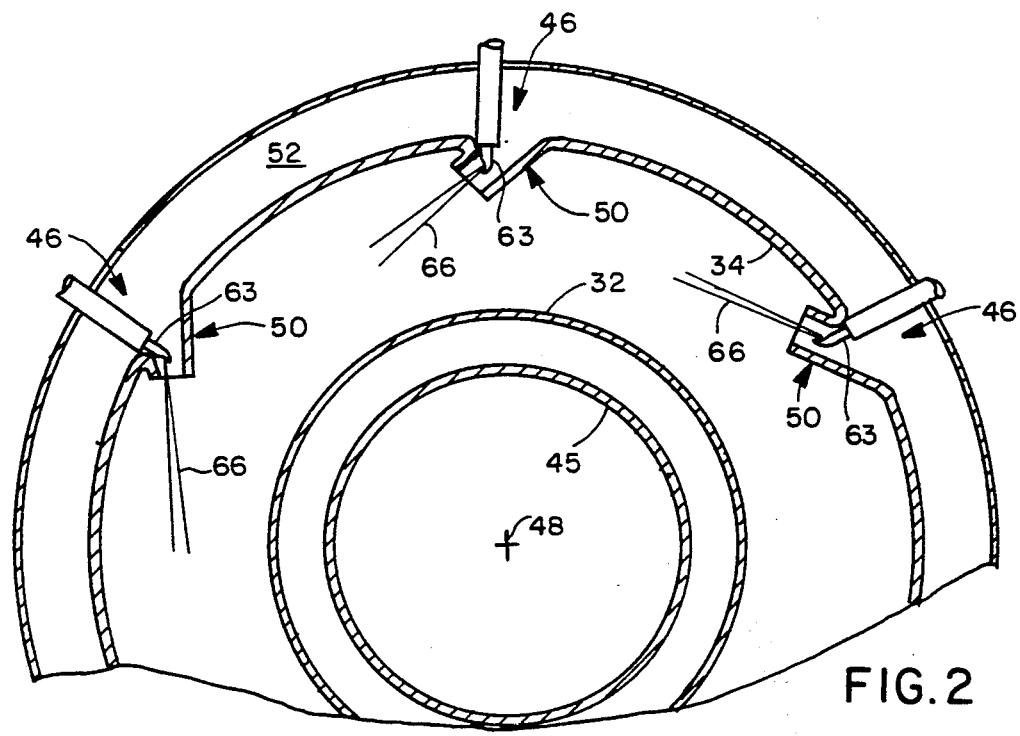
FIG. 2 is a sectional view taken approximately along the line 2—2 in FIG. 1.

Mounted on the wall 44, and extending through the wall 34, are fuel injectors, generally designated 46. As seen in FIG. 2, according to a preferred embodiment of the invention, there are a plurality of the injectors 46, namely, in the particular instance shown, six that are preferably equally angularly spaced about the axis of the rotation of the shaft 10 which is designated by a point 48. Associated with each injector 46 is an air inlet port or air blast tube, generally designated 50. Each air blast tube 50 is in fluid communication with the space 52 between the walls 34 and 44 which serves as a manifold or plenum for compressed air received from the compressor 15 and which is utilized to support combustion within the combustor 26.

The air blast tubes 50 are elongated and generally cylindrical in configuration. The cylindrical axis of each is generally tangential (or circumferential) to the combustion space defined by the walls 32 and 34 and generally speaking, the axis of each of the air blast tubes 50 will be in a single plane that is transverse to the rotational axis 48. However, it is to be understood that in some instances, axial spacing of the air blast tubes 50 may be desired.

Figure 3:
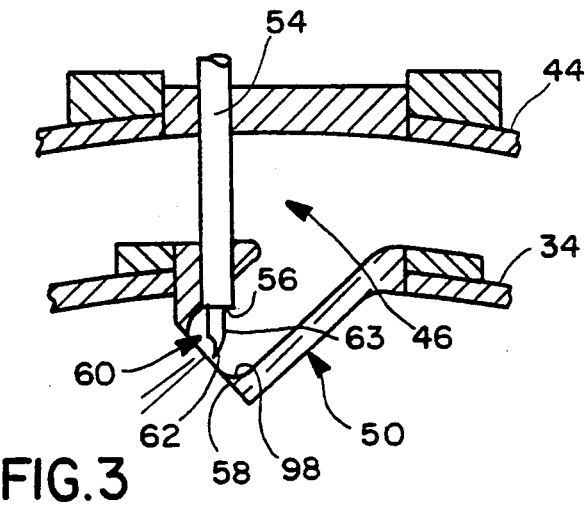
FIG. 3 is an enlarged, fragmentary view of an air blast tube and associated fuel injector utilized in the invention.

As best seen in FIG. 3, each of the injectors 46 includes a tubular fuel conduit 54 terminating at an end 56 near the exit end 58 of the corresponding air blast tube 50. Mounted in the end 56 of the conduit 54 is a fuel injection nozzle, generally designated 60, made according to the invention. It is to be noted that the nozzle 60 includes a flange 62 located to be generally tangential (or circumferential) to the annular combustion space 40. Consequently, fuel injection will be generally circumferential and in the area represented by streams 66 appearing in FIG. 2, although such streams will not actually appear because of atomization of the fuel during turbine operation.

Figure 4:
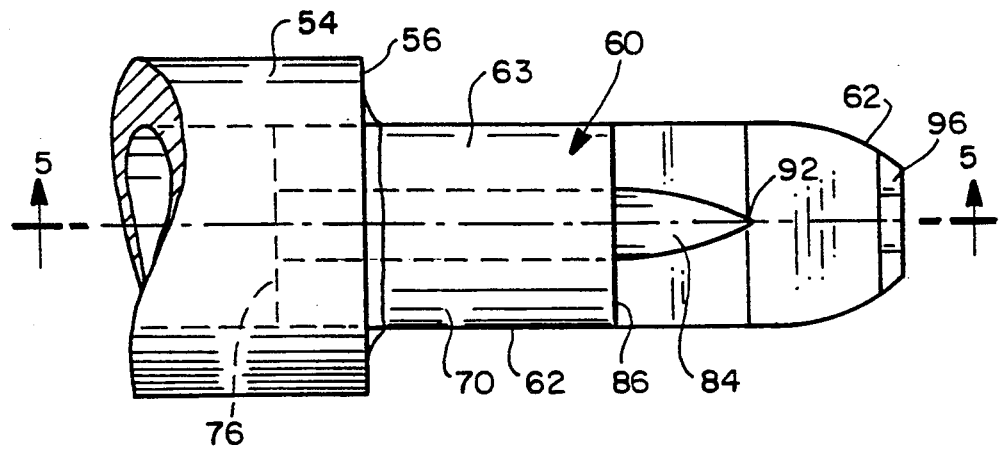
FIG. 4 is an enlarged, fragmentary view of a fuel injector made according to the invention from the top thereof.
Figure 5:
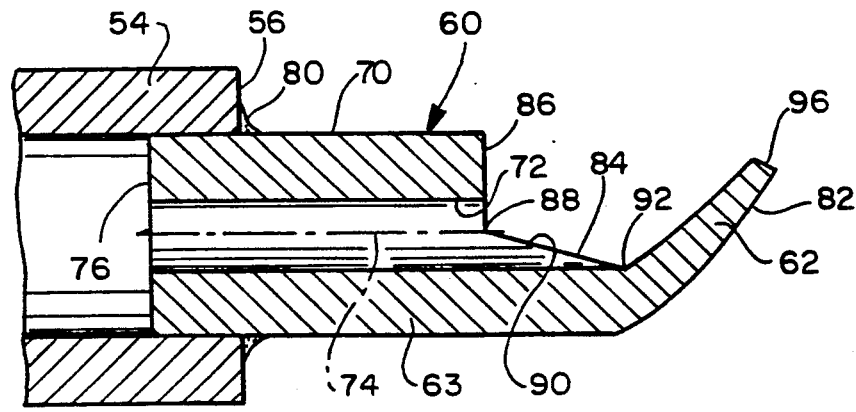
FIG. 5 is a sectional view of the fuel injector taken approximately along the line 5—5 in FIG. 4.

Turning now to FIGS. 4 and 5, the fuel injecting nozzles 62 will be described in greater detail. Each is in the form of a simple tube of capillary cross section, that is, a capillary tube 63. As used herein, the term "capillary tube" is used in the conventional sense, that is, as defined in the Dictionary of Scientific and Technical Terms, published by McGraw-Hill Book Company of New York, N.Y., Copyright 1974. The term "simple tube" as used herein is intended to refer to conduits or the like that are normally considered tubes and which are formed by conventional tube forming methods as opposed to expensive and precision machining operations as are conventionally employed in the formation of pressure atomizing nozzles. Typically, both the outer wall 70 and interior wall 72 of each such tube 63 will be concentric about an axis 74 and usually, but not always, will be of cylindrical configuration. The end 76 of each nozzle 60 opposite from the flange 62 is disposed within the end 56 of the fuel conduit 54 and brazed in place as by brazing 80.

The flange 62 is an integral part of the capillary tube 63 and includes one surface 82 which is part of the outer wall 70 of the capillary tube 63 and an opposite surface 84 which is part of the interior wall 72. The flange 62 is formed integrally on the capillary tube 63 as follows. A first cut is made transverse to the axis 74 from one side of the capillary tube to provide the end or edge designated 86 in FIGS. 4 and 5. The cut forming the edge 86 is taken just past the axis 74 of the capillary tube 63.

A second cut is made diagonally from the diametrically opposite side of the tube so as to intersect the edge 86 at a point 88. The edge left by the diagonal cut is designated 90. At about the point 92 where the cut forming the edge 90 intersects the interior surface 72, the remaining part of the tube is bent upwardly as shown in FIG. 5 and squared off as illustrated at 96. The edges are left sharp and are deburred. The flange 62 is bent at an acute angle so as to extend across the axis 74 without closing the opened end of the capillary tube defined by the cuts producing the edges 86 and 90.

In some instances, the flange 62 may be flattened while in other instances, it may be slightly curved. The shape of the flange 62 in this respect will control the spray path, that is, a flat flange 62 will provide a flat spray while a curved one will provide a somewhat curved spray.

It is significant that the orifice that is defined by the edges 86 and 90 merge smoothly with the flange 62. Thus, the interior 72 form part of one side of the flange 62. In operation, the nozzle 60 provides a film on the flange 62 that is broken up by the blast of air entering the combustor through the air blast tubes 50, even at very low pressure drops. By taking the cut defining the edge 86 past the center line or axis 74 of the tube, a uniform, narrow film like spray is obtained. If the cut is not taken past the axis 74, a maple leaf spray pattern may be obtained.

While the injector described at least superficially resembles impingement injectors, it should be noted that true impingement atomization is not occurring. In an impingement injector, there is a free, unrestrained, flow of fuel between an orifice and a flange and fuel impacts upon the flange after flowing freely and splatters as a result. In the operation of the described injector, the fuel is always attached, at least in part, to some part of the nozzle during its path from the edge 86 to the flange 62 and this results in the generation of the aforementioned film which in turn is broken up by the air blast as the film flows off the edges of the flange 62; and this is to be preferred. However, in a fuel system made according to the invention, impingement injectors may be used with success.

It is preferred to locate the nozzles 60 closely adjacent the exit ends 58 of the air blast tubes 50. However, this is not a completely necessary requirement, although such a location does provide the best atomization. It is also noted that improved atomization is achieved when the ends 58 converge somewhat as illustrated at 98 in FIG. 3.

In instances where high pressure drops in the fuel flow are not of concern, it is possible that the conduits 54 be done away with and a continuation of the capillary tube forming each nozzle 50 utilized as a fuel flow conduit. Generally, however, high fuel flow pressure drops are undesirable with the result that the length of the capillary tube between the end 76 and the edge 86 should desirably remain relatively short.

Figure 6:
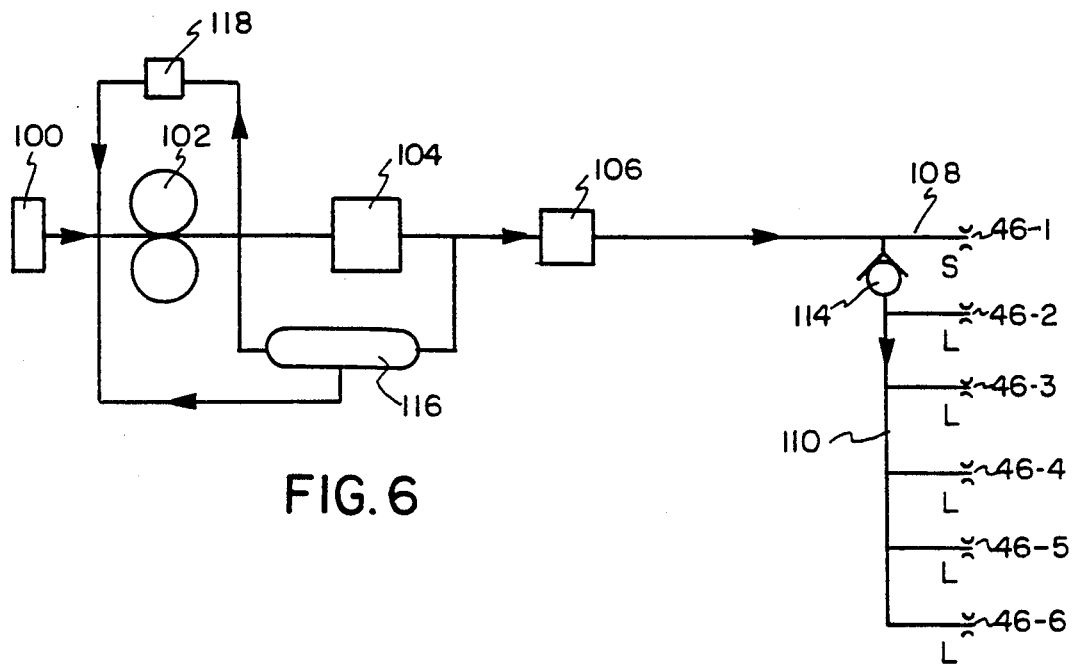
FIG. 6 is a schematic of a fuel system made according to the invention.

A fuel system made according to the invention and utilizing fuel injectors of the sort described above, or utilizing similar impingement type injectors, is illustrated in FIG. 6. A source of fuel is designated 100 and a fuel pump 102 of conventional construction is connected thereto. The discharge side of the fuel pump 102 is connected to a servovalve 104 which is conventionally controlled to control the rate of flow to the injection system. Downstream of the servovalve 104 is a conventional shut-off valve 106 which may be closed when it is desired to halt all fuel flow.

Six injectors are designated 46-1, 46-2, 46-3, 46-4, 46-5 and 46-6. The injector 46-1 is connected in a branch conduit 108 that is in fluid parallel with a conduit branch 110 which feeds each of the injectors 46-2 through 46-6, inclusive.

Located in the branch 110 upstream of the first injector 46-2 is a conventional check valve 114. The check valve 114 has a predetermined crack value which is to say, the valve 114 will remain closed until such time as a pressure in excess of the crack value exists in the fluid flow path between the shut-off valve 106 and the fuel injector 46-1. When that occurs, the valve 114 will open, allowing fuel to flow to the injectors 46-2 through 46-6, inclusive.

The system also includes a pressure differential valve 116 and a relief valve 118 connected in a conventional fashion and operating in a conventional way.

In starting a turbine utilizing a fuel system made according to the invention, relatively low fuel pressures will exist downstream of the shut-off valve 106. During the start process, such low pressures are typically associated with the low fuel flow rates associated with starting a gas turbine at high altitudes. These pressures will typically be less than the crack value of the check valve 114. As a consequence, the entirety of the fuel during a starting position will be injected into the combustor through the injector 46-1. The injectors 46-2 through 46-6 are isolated at this time because the check valve 114 will generally remain closed.

When a start is achieved, the system including the valves 104 and 116 will conventionally act to increase the rate of fuel flow to accelerate the turbine wheel. Because the fuel injectors 46 provide some resistance to the flow of fuel, a pressure increase will occur upstream of the injector 46-1 and such pressure increase will result in fuel pressure exceeding the crack value of the check valve 110. At this time, fuel will flow to all of the injectors 46-1 through 46-6 to provide fuel to the engine in a conventional fashion. Thus, it will be appreciated that in the embodiment shown in FIG. 6, the injector 46-1 acts as a combination start and main fuel injector while the injectors 46-2 through 46-6, inclusive, act solely as main fuel injectors.

Because of the pressure differential that is involved as between the injector 46-1 on the one hand and the injectors 46-2 through 46-6 on the other, frequently, the orifices associated with the injectors 46-2 through 46-6 are made somewhat larger than the orifices associated with the fuel injector 46-1; and the difference in orifice size is indicated in FIG. 6 by the designation "S" as being a relatively smaller orifice and the designation "L" as being for a relatively larger orifice.

Figure 7:
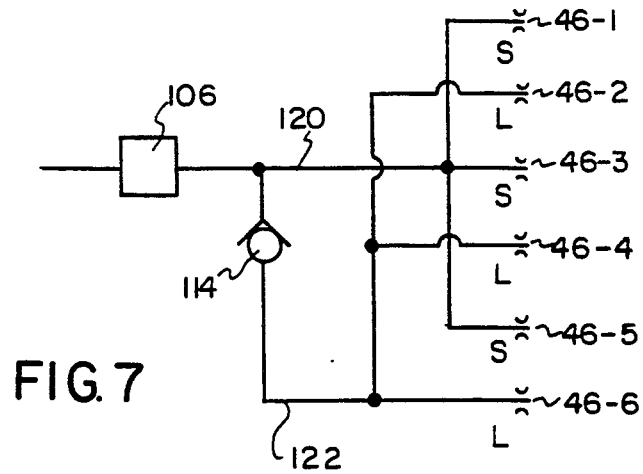
FIG. 7 is a partial schematic of a modified embodiment of the fuel system.

In some instances, it may be desirable to utilize more than one of the injectors 46 as a combination start/main injector. Such a system is illustrated partially in FIG. 7 which illustrates the arrangement of components including the shut-off valve 106 and all elements downstream thereof, the upstream elements being the same as illustrated in FIG. 6. In this embodiment, a first branch 120 is connected to the injectors 46-1, 46-3 and 46-5, all of which are provided with relatively smaller orifices and which act as combination start/main fuel injectors. In parallel with the branch 120 is a branch 122 which contains the check valve 114 and which is connected to the injectors 46-2, 46-4 and 46-6, all of which act solely as main fuel injectors and which are provided with relatively larger orifices.

It will be particularly noted that according to the invention, the fuel system between the shut-off valve 106 and the fuel injector 46 is free of any valve other than the check valve 114. Customarily, a valve might be provided in this area, particularly in connection with those injectors used as start injectors, to assist in the purge process.

It will also be noted that no means need be provided for purging any of the injectors since they are all used as main fuel injectors which do not require purging.

And while the invention has been described as utilizing air blast, fuel impingement or fuel film atomizing injectors at all injector locations, other types of injectors may be utilized at those locations where the injectors serve only as main fuel injectors. It is, however, important to the invention that where, as in the embodiment of FIG. 6, the injector 46-1 serves both a start and a main fuel injection function, the same be a fuel impingement or fuel film atomizing air blast type of injector.

Thus, utilizing the superior atomization provided by such injectors, such injectors selectively may be utilized as combination start and main fuel injectors according to the invention which in turn allows the elimination of valves that might be utilized to terminate operation of a conventional start injector as well as the various plumbing associated with purge circuits for injectors utilized solely as start injectors. As a consequence, the expense of such components is likewise minimized and the degree of complexity of the system provided by such components is reduced as a result of their absence. Consequently, reliability is improved.

I claim:

1. A fuel injection system for a gas turbine engine including an annular combustor comprising;
    a plurality of circumferentially spaced fuel injectors each adapted to be disposed within an annular combustor to inject fuel therein in the generally circumferential direction;
    a source of fuel to be combusted;
    first and second conduit branches in fluid parallel with one another, one of said branches begin connected to at least one of said injectors, the other of said branches being connected to the remainder of said injectors;
    means, including a pump, interconnecting said source and said branches; and
    a fuel shut-off valve between said pump and said branches;
    a fuel control valve located between said source and said shut-off valve for controlling the flow of fuel to said injectors;
    a normally closed, pressure responsive valve isolating said other branch from said interconnecting means for low fuel pressures typical of the starting of a turbine engine and openable at somewhat higher pressures to allow fuel to flow to all of said injectors;
    at least the injector in said one branch including a fuel injecting aperture and a fuel impingement or fuel film atomizing flange aligned with said aperture;
    said system being characterized by the absence of any valves between said shut-off valve and said injectors other than said pressure responsive valve.

2. The fuel injecting system of claim 1 wherein said pressure responsive valve is a check valve.

3. The fuel injector system of claim 1 wherein all of said fuel injectors include said aperture and said flange.

4. The fuel injector system of claim 1 wherein said one branch has only one of said injectors.

5. The fuel injector system of claim 1 wherein said one branch has a plurality of said injectors.

6. The fuel injector system of claim 5 wherein there is a substantially equal number of injectors in both said branches.

7. The fuel injector system of claim 1 wherein said pressure responsive valve is a check valve having a predetermined crack value setting the lower value of said somewhat higher pressures.

8. The fuel injector system of claim 1 wherein the fuel injecting apertures in the injectors in said other branch are larger than the fuel injecting apertures int eh injector or injectors in said one branch.

* * * * *